Dec. 25, 1951  E. J. NAGY ET AL  2,579,510
RANGE SOLUTION APPARATUS
Filed Nov. 11, 1944  3 Sheets-Sheet 1

INVENTORS
EDWARD J. NAGY
BY EDMUND B. HAMMOND JR.
ATTORNEY

Dec. 25, 1951     E. J. NAGY ET AL     2,579,510
RANGE SOLUTION APPARATUS
Filed Nov. 11, 1944     3 Sheets-Sheet 2

INVENTORS
EDWARD J. NAGY
EDMUND B. HAMMOND, JR.
BY Herbert H. Thompson
ATTORNEY

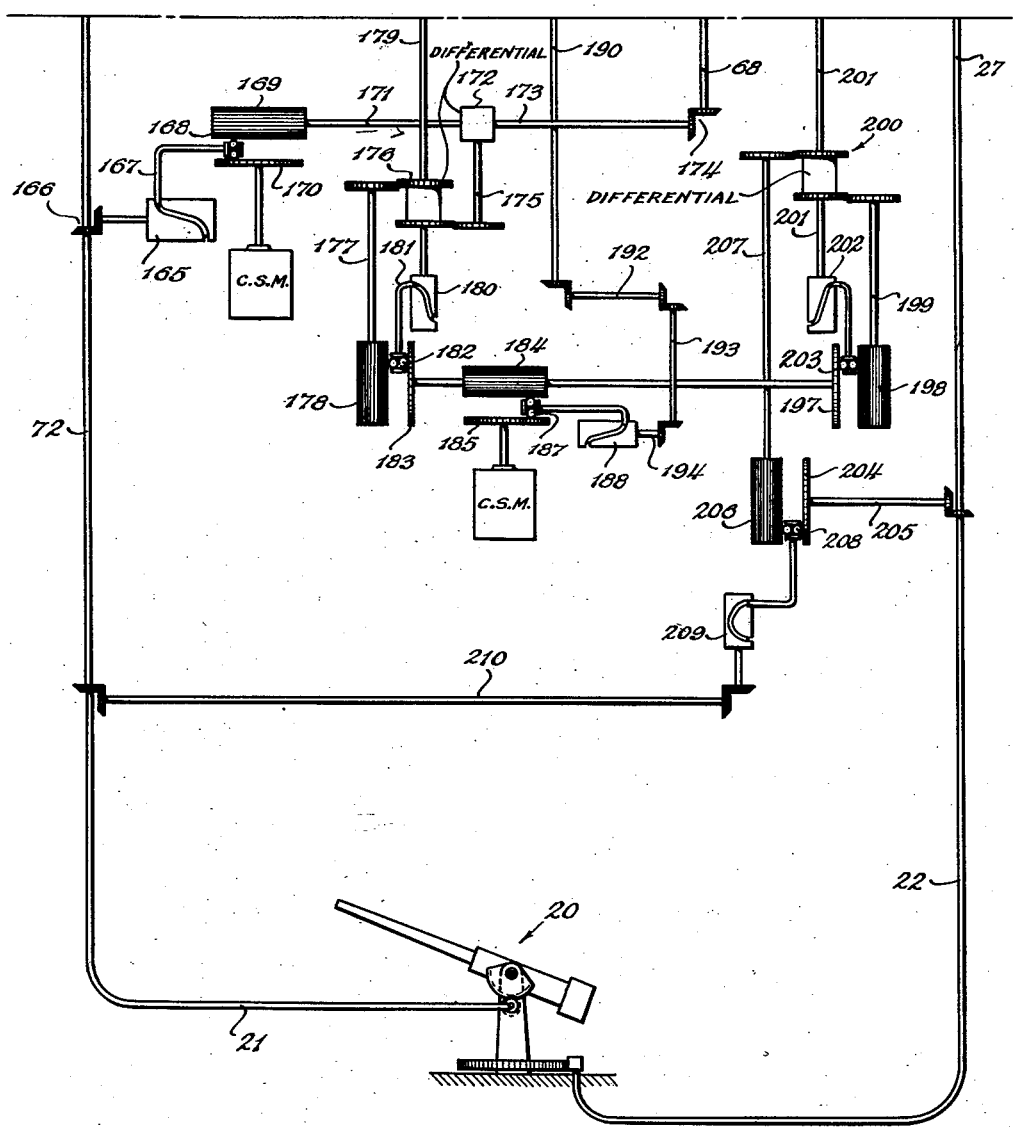

Patented Dec. 25, 1951

2,579,510

UNITED STATES PATENT OFFICE 2,579,510

RANGE SOLUTION APPARATUS

Edward J. Nagy, Garden City, and Edmund B. Hammond, Jr., Floral Park, N. Y., assignors to The Sperry Corporation, a corporation of Delaware Application November 11, 1944, Serial No. 563,068

9 Claims. (Cl. 33—49)

This invention relates to computing mechanisms for gun sights.

An object of the invention is to provide a simple and compact computing mechanism in which the gun angle data are more accurately computed than in former sights.

Another object is the provision of a highly accurate time of flight computing mechanism for a gun sight.

Figure 1:
Figure 2:
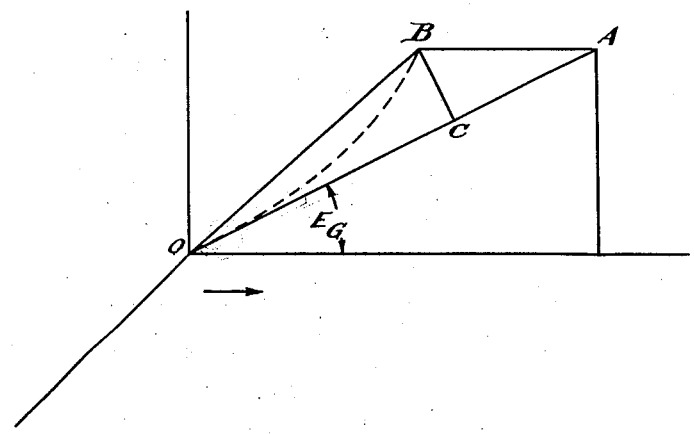
Figure 3:
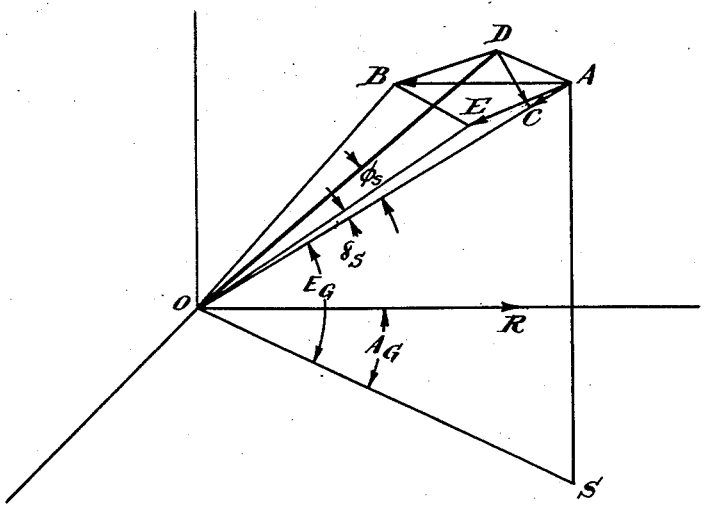

Other objects will appear in the following description given with the aid of the accompanying drawings, of which Figs. 1, 2 and 3 are diagrams illustrating the operation of the invention; and Figs. 4 and 5 taken together show schematically a preferred embodiment of the invention.

The ballistic computing mechanism of the present invention provides a novel and highly accurate time solution which is used in the prediction mechanism to provide more accurate prediction. Prediction is a first order correction and hence total deflection as solved by any computer is no better than the prediction solution which depends directly on time of flight.

A novel feature of the present ballistic mechanism is a time of flight solution based on the consideration of range at zero air speed from which the ballistic deflections are computed. The ballistic mechanism is actuated by a time of flight, $T°$, input which drives through a ballistic circuit to a range measuring device. The range at zero air speed corresponding to the input time of flight is modified by a factor involving the range deflection along the gun line to give the present range of the target corresponding to the input present time of flight of the projectile as a function of range, air speed, density, gun azimuth, and gun elevation.

Gravity deflection is introduced as an equivalent prediction. This gravity prediction is defined as the product of gravity rate and time of flight. For all practical purposes, gravity rate is a function only of gun elevation.

Referring to Fig. 1, assume that a gun at O is pointed along OA, the gun being at zero azimuth and elevation and further consider that the projectile is not acted upon by gravity. If the gun has zero air speed, then after a time $T_1$, a projectile would reach the position A with respect to the gun at O. The range represented by OA is the range at zero air speed referred to hereinafter as range $D_1$. When the gun has a velocity in the direction indicated by the arrow, then the position of the projectile with respect to the gun, after a time $T°$ is represented by B.

The distance OB represents the present range of the projectile relative to the gun after a time $T°$, hereinafter referred to as the range $D°$.

The gun at O in Fig. 2 is represented positioned at some elevation angle $E_g$. If the azimuth angle is zero, at zero air speed the projectile after a time $T_1$ will reach the point A. If a velocity is imparted to the gun, in the direction of the arrow, the relative position of the gun and projectile after a time $T°$ is indicated by the point B on OB. Then, as before, the distance OB represents the present range $D°$ of the projectile relative to the gun after a time $T°$. The distance OA represents the range $D_1$ at zero air speed, AB represents the total linear windage deflection relative to the gun, and AC the range deflection hereinafter referred to as $D_d$. Since the trajectories of aircraft projectiles are essentially flat, the equality of OB and OC may be assumed. Hence $$OA = OC \ (=OB) + CA \quad (1)$$
$$D_1 = D° + D_d \quad (2)$$

For any input time of flight, the computer determines the fixed coordinate range. This range is dependent only on time of flight and air density. It is the distance the projectile would travel in a given time when the gun is fired from a fixed point in space. This range alone as such has no meaning in aircraft gun-fire where the gun is moving, since it is attached to an airplane moving with a definite velocity. The position of the projectile relative to the gun when the gun is moving at a given velocity is different from the position of the projectile relative to the gun when the gun is stationary for the same time of flight. The distance between the gun and projectile for a given time of flight T in the case where the gun is moving is $D°$. The distance between the gun and the projectile for a given time T in the case where the gun is stationary is $D_1$. The difference between $D_1$ and $D°$ is the range deflection $D_d$, and is due to the fact that the gun is not fixed but is moving at a definite velocity.

The magnitude of the range deflection is dependent upon gun velocity, density, time of flight, gun azimuth and gun elevation. When the gun is moving its effective muzzle velocity has been changed, and therefore, relative to the gun, the distance the projectile travels is changed as compared to the case where the gun is stationary. The total linear ballistic deflection may be projected upon the gun line. This projection is what is called the range deflection $D_d$ and is the difference between $D_1$ and $D°$. The consideration of range deflection in a ballistic computer is believed to be novel. In the computing mechanism about to be described the values of $D_d$ and $D_1$ are known for all time of flight values and therefore the corresponding range value $D_0$ can be readily determined and since time of flight, $T_0$, depends on range, an accurate measure of $T_0$ is obtained which in turn provides more accurate prediction.

The ballistic portion of the computer is based upon the following three premises:

1. That the total ballistic deflection relative to the gun may be expressed as a function of time (of flight) air speed, and density;
2. That the total ballistic deflection may be resolved into three components which are the lateral, vertical, and range deflections; and
3. That the range deflections may be used to determine range.

The lateral deflection $\delta_s$ is the projection of the total ballistic deflection angle AOB on the lateral plane of the gun defined by EAO. The vertical deflection $\phi_s$ is the projection of the total ballistic deflection angle AOB on the elevation plane of the gun. The range deflection $D_d$ is the projection of the total linear ballistic deflection AB upon the gun line.

These deflections are shown in Fig. 3 where OR is the line of flight of an airplane carrying the gun. OA is the gun line: OS is the projection of the gun line in a horizontal plane; and AB is the total windage deflection in yards. This latter deflection when divided by range gives total windage in mils. Point O is determined by the projection of AB along the gun line AO.

EAO defines a lateral plane perpendicular to a vertical plane defined by OAD which extends through the gun, OA being the gun line.

Angle DOC is a measure of vertical deflection $\phi_s$, and angle EOC is a measure of lateral deflection $\delta_s$. Angle EOC lies in a plane through the gun perpendicular to that of angle DOC. As in Fig. 2, the distance OB is a measure of present range $D_0$; AC is the projection of AB on the gun line and is equal to range deflection, $D_d$, and OA is equal to the zero air speed range $D_1$.

Time of flight, $T_0$, depends on present range $D_0$, the range deflection $D_d$ and the zero air speed range $D_1$. In general the deflections are $$\frac{D_d}{D_0}=T_0[R\cos A_g \cos E_g + K_g \sin E_g] \quad (3)$$

where R is a function of air density and air speed, as given below and $K_g$ is a gravity constant. Likewise the azimuth and elevation ballistic deflections may be expressed as functions of time as $$\delta_s = T_0 R \sin A_g \quad (4)$$

and $$\phi_s = T_0[R\cos A_g \sin E_g + K_g \cos E_g] \quad (5)$$

The total angular windage deflection $\theta$ may be expressed as a product of the functions of the variables time of flight, indicated air speed, IAS (or true air speed, TAS), and density, $\sigma$.

$$\theta = f_1(\sigma) f_2(TAS) f(T_0) \quad (6)$$

or $$\theta = f_3(\sigma) f_4(IAS) f(T_0) \quad (7)$$

For the .50 caliber M2 projectile $$f(T_0) = T_0 \quad (8)$$

Hence $$\theta = T_0 f_3(\sigma) f_4(IAS) = T_0 R \quad (9)$$

The function of air speed and density comprising R are determined empirically from the values of R obtained from the tabulated values of ballistic deflection in the ballistic tables for the .50 caliber M2 projectile supplied by the Government. From the ratio of the windage deflection of time of flight, the functions of $f_3(\sigma)$ and $f_4$ (IAS) are determined.

Tables of range deflections as such are not supplied by the Government and the values of $D_d$ and $D_1$ were obtained from plots of time against range at zero air speed. These plots and Equation 2 were used to obtain all of the necessary data for the construction of the cams of the ballistic mechanism described below.

The following equations suitable for mechanical solution have been derived from Equations 3, 4 and 5:

$$\delta_s = T_0 R F_1(RT, A_g) \quad (10)$$

$$\phi_s = F_3(E_g, \phi) + T_0 K_a F_4(E_g) \quad (11)$$

$$\frac{D_d}{D_0} = F_5(E_g, \phi) + T_0 K_b F_6(E_g)$$

where $$\phi = T_0 R F_2(A_g, RT) \quad (12)$$

$$R = f_3(\sigma) f_4(IAS) \quad (13)$$

and $K_a$ and $K_b$ are constants.

The functions F are not known as equations. They are obtained by designing cam surfaces to fit the data graphically.

The computing mechanism of the present invention will now be described more specifically. The mechanism is shown, for the purpose of explanation, as being used in connection with portions of a well known computing gun sight mechanism of the "K-3" type which has been altered to include a mechanism for solving ballistic deflections and providing a measure of time of flight in accordance with the present invention. Further on, it will be noted that logarithms are used extensively in the mechanism. This arrangement simplifies the mechanism as multiplication can be accomplished by adding logarithms. Target dimensions are conveniently introduced by logarithms. It will be understood that the present invention is not limited to the specific arrangement shown and that it could be designed quite easily to calculate by linear values where it is advantageous to do so. The present arrangement is used as a simple means of explaining the operation of the invention.

Figure 4:
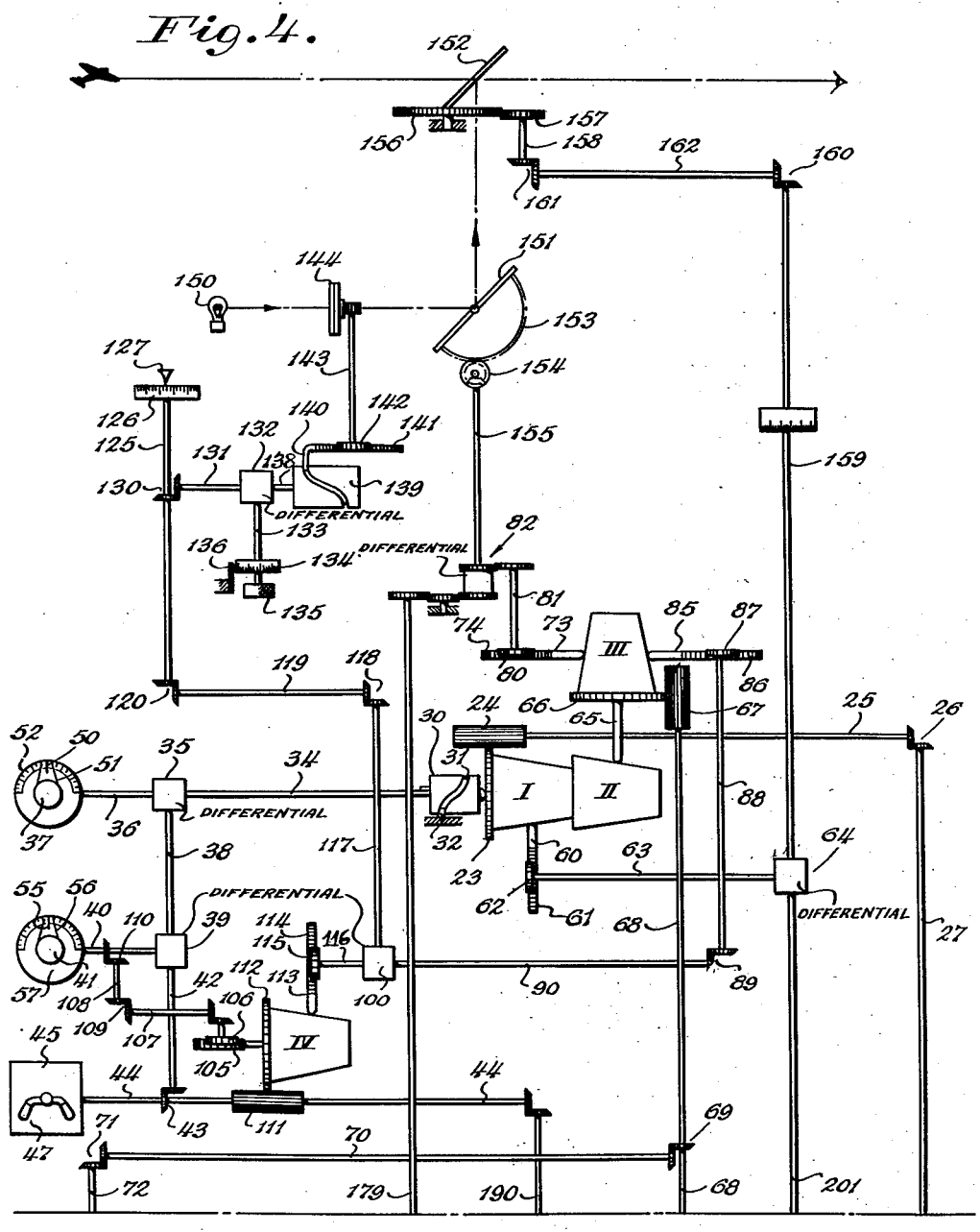

Referring to Figs. 4 and 5, a gun 20 supported for movement about elevation and azimuth axes transmits its movements in the known manner, such as by flexible elevation shaft 21 and a similar azimuth shaft 22 to the computing mechanism of a sight, the computing mechanism being adapted in response to the angular displacement of the gun to effect automatically such relative displacement of the gun and a line of sight defining means that a projectile from the gun will strike a relatively moving target.

The computing mechanism includes ballistic and prediction computers, the outputs of which effect a relative offset of the line of sight defining means according to the algebraic sum of prediction and ballistic deflections in azimuth and elevation respectively.

A cam assembly including three dimensional cams I and II are rotated in proportion to the gun azimuth angle $A_g$ by means of gear 23 integral with the cams which meshes with long pinion 24 on shaft 25 coupled by gears 26 and shaft 27 to the azimuth input shaft 22.

This cam assembly is translated by a pivotally connected cam 30, having a cam groove 31 formed therein in which a fixed cam follower 32 is positioned. Hence rotation of cam 30 translates cams I and II in accordance with the contour of the cam groove 31, but due to the pivotal connection no rotary movement is transmitted between cam 30 and cams I and II.

Cam 30 is rotated by shaft 34 connected with an output of a differential 35. One input 36 of the differential is displaced in accordance with air speed by a knob 37. The other input of the differential is controlled by a shaft 38 which is the output shaft of a differential 39. One input of this differential is a shaft 40 displaced by knob 41 according to altitude which introduces an air density value into the circuit. The other input for differential 39 is a shaft 42 connected by gears 43 to shaft 44 which is displaced by some suitable arrangement such as a known range motor 45 according to the logarithmic time of flight, $T_0$ value, to be described. The range motor may be operated in the known manner, such as by a push button on control grips 47, or by any other suitable device.

Knob 37 is provided with an index 50 on a transparent arm 51 which is set with reference to a lagarithmic scale 52 so laid out that when the index 50 is positioned over the appropriate indicated air speed value, the displacement of shaft 36 is proportional to a logarithm of the function of the air speed value, the function being identified as $f_4$ in Equation 13.

Altitude knob 41 is provided with an index 55 on a transparent arm 56 connected thereto which is positioned with reference to dial 57 laid out in altitude values, the dial being calibrated according to a logarithm of a function of air density such that when the index 55 is positioned, the shaft 40 is displaced according to a logarithmic function of density, $\sigma$, the function in the present embodiment being $f_3(\sigma)$ of Equation 12. As already mentioned, input shaft 42 of differential 39 is displaced in accordance with a logarithm value of time of flight $T_0$, and this quantity is added to the logarithmic functions of air speed and density in differentials 39 and 35, the output shaft 34 being displaced together with cam 30 in rotation by the sum of these logarithmic functions. The combined functions of density and air speed is the quantity R in the various equations. Cam 30 is an antilog cam which when rotated translates cams I and II according to $T_0R$. These cams, as already described, are rotated in proportion to gun azimuth $A_g$. Cam I is laid out empirically according to data from ballistic table. Cam I is laid out so that when actuated as described its lift pin 60 is displaced according to $T_0 R F_1 (RT, A_g)$ which is the lateral ballistic deflection. The lift pin has a rack 61 formed thereon meshing with a gear 62 on an input shaft 63 of a differential 64. This differential adds the azimuth prediction and ballistic deflections to obtain a total lateral deflection value for offsetting the optics of the sight in azimuth and will be more fully described further on.

Cam II has the same input displacements as cam I and is so laid out that its lift pin 65 is displaced according to $T_0 R F_2 (RT, A_g)$, which function $(\phi)$, is common to both vertical and range deflections. Lift pin 65 translates elevation cam III. The latter cam is rotated by a gear 66 formed thereon which meshes with a long pinion 67 on shaft 68 connected by gears 69, shaft 70, gears 71 and shaft 72 to the elevation input shaft 21. The cam is so laid out that with the inputs described, lift pin 73 will be actuated according to $F_3 (E_g, \phi)$. This deflection need only be corrected for gravity, G, to give $\phi_s$, the elevation ballistic deflection as will be described.

Lift pin 73 has a rack 74 formed thereon which meshes with a gear 80 on shaft 81 which is an input for differential 82. Elevation ballistic and prediction deflections are added by differential 82 whose output effects a corresponding deflection of an elevation member in the optical system which defines the line of sight to be described.

On comparing Equations 3 and 5 and also 11 and 12, it will be seen that the equations for the elevation ballistic deflection $\phi_s$ and for the ratio of range deflection to present range have the common term $\phi$. A separate cam could be fixed to cam III to be operated by the same inputs and this added cam could be laid out to give the lift pin displacement required for range deflection. Since $\phi$ is common to both equations, an added cam is not necessary because by providing a second lift pin 85 for cam III displaced 180° from lift pin 73, the cam can be modified to displace lift pin 85 to give the logarithm of $$\frac{D_0}{D_1}$$

with the described inputs. The layout is accomplished by graphical procedure and results in lift pin 85 being displaced in accordance with a logarithmic value of $$\frac{D_0}{D_1}$$

for all conditions of range, density, air speed and gun position.

Lift pin 85 has a rack 86 formed thereon meshing with a gear 87 on shaft 88 coupled by gears 89 to the input shaft 90 of a differential 100. The output shaft of this differential operates a range measuring device to be described.

A cam IV is translated according to the logarithm of the function of density $f_3 (\sigma)$ by means of rack 105 attached to the cam and a gear 106 meshing with the rack. Gear 106 is driven from the altitude knob 41 by an arrangement of shafts 107 and 108 and gears 109 and 110 which couple gear 106 to the shaft 40 of the altitude knob.

Cam IV is rotated according to the logarthm of time of flight, $T_0$, by a long pinion 111 on shaft 44 which meshes with the gear 112 on the cam. The cam is so laid out as to displace the lift pin 113 thereof according to the logarithm of $D_1$. This layout is such that for every time of flight value by which shaft 44 displaces the cam, the lift pin 113 is displaced in accordance with a measure of range at zero air speed and at any given air density. The density of course depends on the translation input of the cam. The range value as already described is represented in the drawings by the distance OA and in the equations by $D_1$. The displacement of lift pin 85 of cam III corrects this value $D_1$ to obtain present range $D_0$ as will now be described. The lift pin 113 has a rack 114 formed thereon meshing with a gear 115 on a second input shaft 116 of differential 100. Since the other input shaft 90 of the differential is displaced according to the logarithm.

$$\frac{D_0}{D_1}$$

the output shaft 117 is displaced in accordance with the logarithm of present range $D_0$.

Shaft 117 is shown as controlling a range finding device of substantially the same type used in the various sights of the "K" series of sights which are well known to the armed forces, and therefore will only be briefly described.

Shaft 117 is coupled by means of gears 118, shaft 119, and gears 120 to a shaft 125 on which is mounted a range dial 126 calibrated to de-log the input shaft displacement. The dial is read with reference to index 127.

Shaft 125 drives through gears 130, an input shaft 131 of a differential 132. A second input shaft 133 of this differential has a target dimension scale 134 mounted thereon together with a knob 135. The scale is calibrated in logarithms of target dimensions such that when set by knob 135 with reference to index 136, the displacement of shaft 133 is in accordance with the logarithm of the target dimension value. The displacement output shaft 138 is equal to the sum of the input displacements, and is used to rotate a de-logging cam 139 whose cam follower is displaced according to the product of range D₀ and target dimensions. The cam follower 140 is shown schematically as displacing a rack 141 coupled by gear 142 and shaft 143 to a light gate indicated by the oblongs 144. The light gate may be any suitable variable reticle arrangement. The light gate and optical system used herein are known devices.

Light from a light bulb 150 shines on light gate 144 and an image of the reticle of the light gate which is adjustable in size falls on elevation mirror 151 which reflects the image onto a transparent mirror 152, displaceable according to total azimuth deflection. The operator observes the target through the mirror 152 and orients the sight until the target is centered in the image of the reticle.

When target dimension knob 135 is adjusted to position scale 134 according to a known dimension of the target, and the air speed and altitude is set in by positioning knobs 37 and 41, the light gate is thereafter adjusted by operating the range motor to effect such displacement of shaft 44 as to cause the adjustable reticle of the light gate to bracket the target. Under these conditions, the mirrors 151 and 152 are so positioned that the line of sight and the gun bore are relatively offset according to the lead angles required for the projectile to strike the relatively moving target being tracked by the sight. The lead angles include a gravity correction, and also a prediction component, a portion of the mechanism shown for computing the latter being generally similar to that of a known "K" sight, and the method of making both corrections are to be described.

Elevation mirror 151 is supported by a sector 153 pivoted on a horizontal axis and provided for adjustment purposes with gear teeth which mesh with those of gear 154 on output shaft 155 of differential 82.

Azimuth mirror 152 is supported on a plate 156 pivoted on a vertical axis. The mirror is positioned according to total lateral deflection by the following mechanism. The plate is provided with gear teeth in mesh with those of a gear 157 on shaft 158 connected to output shaft 159 of differential 64 by means of gears 160 and 161 and shaft 162. Differential 64 has already been described as adding the lateral ballistic and prediction deflections.

The prediction solution of the mechanism shown in the drawings is based on the use of angular gun rates multiplied by time of flight to the present position of the target. The prediction angle is determined by the angular travel method in which the angular velocity of the guns is multiplied by time of flight of the projectile to the present position of the target.

The prediction solution is accomplished by means of azimuth and elevation variable speed units. The discs of these units are rotated in proportion to the reciprocal of the time of flight (1/T₀) by the drum of a master variable speed unit. The disc of the master unit rotates at a constant speed and its ball carriage is positioned in proportion to (1/T₀) by a grooved cylindrical cam coupled with shaft 44 whose displacement is proportional to the logarithm of T₀.

The correction for gravity is accomplished by means of a cam 165, Fig. 5, coupled by gears 166 to the gun elevation Eg, shaft 72. The cam has a follower 167 which displaces the ball carriage 168 of a variable speed drive having a cylinder 169 and a disc 170 driven at constant speed. The cylinder is coupled to input shaft 171 of differential 172. The other input shaft 173 of the differential is driven from the gun elevation shaft 72 by means of gears 174. Output shaft 175 of differential 172 drives an input for the elevation equating differential 176. Shaft 177 connects cylinder 178 of the elevation variable speed unit to another input of differential 176. The output shaft 179 of this differential is connected to cam 180 and also to an input of differential 82. The displacement of shaft 179 represents a measure of the elevation prediction angle corrected for gravity, and this displacement is added by differential 82 to the elevation ballistic deflection to adjust the angular position of mirror 151 in accordance with the sum of prediction and ballistic deflections.

Cam 180 has a follower 181 which displaces the ball cariage 182 of the elevation variable speed drive. The disc 183 of this variable speed drive is turned in proportion to 1/T₀ by cylinder 184 of a master variable speed drive referred to above which has a disc 185 driven at constant speed and a ball carriage 187 displaced by a delogging cam 188 rotated in accordance with the logarithm of time of flight T₀ by shaft 44 through a train of gears and shafts, including shafts 190, 192, 193 and 194.

When the target is being tracked in elevation, cam 165 displaces ball carriage 166 of the gravity rate variable speed drive in accordance with the gravity correction required for the elevation angle of the gun. The cylinder 169 displaces the associated input differential 172, whose second input 173 is displaced in accordance with the changing gun elevation angle. These displacements are added by the differential whose output shaft displaces an input of differential 176 causing cam 180 to turn and move ball carriage 182 of the elevation variable speed drive from the center of the disc, thus causing cylinder 178 to turn and drive the equating rate shaft 177 which displaces the second input of equating differential 176. The ball carriage will continue to be displaced until the rate of the equating rate shaft and the rate of rotation of shaft 175 are equal and cancel out in the equating differential 176. When this condition is attained, output shaft 179 of the differential which displaces the ball carriage via cam 180 becomes stationary and the angular position of the shaft 179 is a measure of elevation prediction, corrected for gravity.

Drum 184 also rotates disc 197 of the azimuth variable speed drive which has a cylinder 198 coupled by equating rate shaft 199 to an input of azimuth equating differential 200. The output shaft 201 of the differential rotates cam 202 which displaces ball carriage 203 of the variable speed drive.

Since the line of sight is in a slant plane, it is necessary to convert azimuth velocity in a horizontal plane to azimuth velocity in a slant plane before multiplication by $1/T_0$. This is accomplished by a variable speed drive having disc 204 connected by shaft 205 to the gun azimuth $A_g$ input shaft 27 and a cylinder 206 connected to input shaft 207 of equating differential 200.

The ball carriage 208 is displaced by a cam 209 driven from the gun elevation shaft 72 by shaft 210 and suitable gearing. Cam 209 is so laid out as to position ball carriage 208 in proportion of the cosine of gun elevation and thus drum 206 is caused to rotate in gun azimuth rate in a slant plane.

The operation of the azimuth variable speed drive is similar to that of the elevation variable speed drive. The output of the cylinder 206 is fed through differential 200 to the variable speed multiplier where it is multiplied by $1/T_0$ in the same manner as for elevation prediction. The product of the two input values is the azimuth prediction deflection represented as a displacement of shaft 201 which is connected to an input of differential 64 where it is added to the azimuth ballistic deflection, a total lateral deflection value appearing as a displacement of the differential output shaft 159 which controls the angular position of azimuth mirror 152.

In reviewing the operation of the device it will be assumed that the general operation of the "K" series of sights is understood by those skilled in the art as many thousands of such sights have been used for some time by the armed forces and numerous publications describing the theory, construction and maintenance of such sights have been issued to authorized persons.

For accurate prediction, an accurate measure of time of flight is necessary, and time of flight is a function of range. The present invention determines range in a novel manner based on the consideration of range at zero air speed at any given value of air density. Cam IV is translated according to altitude and rotated according to time of flight and is laid out empirically to give as an output displacement, range at zero air speed. This displacement is accurately calculated from a study of the ballistic tables. The range at zero air speed is corrected for flight conditions by means of outputs taken from the ballistic cams to give present range $D_0$ which is the range for the gun mounted on an airplane. In the particular mechanism shown, the shaft displacement required to turn cam IV is in accordance with the time of flight, a logarithm being used for convenience and simplification, and this shaft furnishes a measure of time of flight for the ballistic mechanism.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a computing mechanism for airborne ordnance of the kind having a ballistic mechanism displaced with the target tracking movement of a gun and by an air speed input, the improvement which comprises a cam displaced in one dimension in accordance with time of flight, a lift pin therefor, the cam being so laid out as to displace the lift pin in proportion to range at zero air speed, range measuring means jointly controlled by the lift pin and by said ballistic mechanism, the latter modifying the lift pin displacement to compensate for the velocity at which the gun is moving and the angular position of the gun.

2. A computing mechanism for airborne ordnance comprising means displaceable in accordance with time of flight, computing means operated thereby for computing range at zero air speed, range finding means including an adjustable member for range measuring purposes controlled in part by the computing means, ballistic deflection computing means including means computing the component of deflection along the gun line, means actuated thereby in accordance with computed ballistic deflections for further controlling the adjustable member to so modify the operation thereof in accordance with gun position and air speed that the input time of flight displacement for the adjustment required for the first mentioned means to measure range is an accurate measure of time of flight for present range of the target.

3. A computing mechanism for airborne ordnance comprising a time of flight shaft, computing means operated thereby for computing range at zero air speed, range finding means including a reticle adjustable to bracket a target for range measuring purposes controlled in part by the computing means, ballistic deflection computing means including means computing the component of deflection along the gun line, means actuated thereby in accordance with computed ballistic deflections for further controlling the adjustment of the reticle to so modify the adjustment according to gun position and air speed that the displacement of the time of flight shaft required to cause the reticle to bracket the target is a measure of time of flight for the present range of the target.

4. In a lead angle computing mechanism for airborne ordnance, means for computing time of flight at zero air speed and at any given value of air density, a ballistic mechanism controlled by the movement of a gun in tracking a target for computing the ballistic component of lead angles including the component of deflection along the gun line, and means operated by the outputs of said means and said mechanism for measuring range.

5. In a lead angle computing mechanism for airborne ordnance, means for computing range at zero air speed at any given value of air density, a ballistic mechanism comprising a plurality of cams, input means for displacing the cams according to a component of deflection along the gun line to predetermined functions of air speed, air density and gun position, and output means for the ballistic mechanism for so controlling the output of the first mentioned means as to correct the same according to present range.

6. In a device for computing lead angles for an airborne target tracking device, means for computing range at zero air speed at any given value of air density values within a predetermined range of air density values, a ballistic mechanism including means determining the component of deflection along the gun line, comprising a plurality of cams, input means for displacing the cams according to predetermined functions of air speed, air density and the position of the tracking device, and output means for the ballistic mechanism for so controlling the output of the first mentioned means as to compute present range.

7. In a device for computing lead angles for an airborne target tracking device, a three dimension cam, means for displacing the cam in one dimension in accordance with a function of air density, and in a second dimension in accordance with time of flight, a lift pin for the cam, the cam being so laid out as to displace the lift pin in accordance with range at zero air speed, ballistic cam means displaced by the target tracking device in accordance with the angular position thereof and in accordance with functions of air speed and air density, output means for the ballistic cam means, means jointly controlled by the lift pin and by the ballistic cam output means, the last mentioned output being such as to correct the lift pin displacement for flying conditions and thereby operate the jointly controlled means in accordance with the present range.

8. In a computing device for airborne guns, a member movable in accordance with range at zero airspeed, a ballistic deflection computing mechanism including means computing the component of deflection along the gun line, and means controlled by said ballistic mechanism for controlling the movement of said member in accordance with the velocity at which the guns are being transported.

9. In a lead angle computing mechanism for airborne ordinance, range measuring means, a pair of members for jointly adjusting the range measuring means, means displacing a first of the members in accordance with range at zero airspeed, means modifying the displacement of the other of said members in accordance with the velocity at which the ordinance is being transported, angular gun displacement conditions, and the component of deflection along the gun line.

EDWARD J. NAGY.
EDMUND B. HAMMOND, Jr.

REFERENCES CITED

The following references are of record in the file of this patent:

UNITED STATES PATENTS

| Number | Name | Date |
|---|---|---|
| 2,356,830 | Crowther | Aug. 29, 1944 |
| 2,385,348 | Chafee | Sept. 25, 1945 |
| 2,396,701 | Holschuh et al. | Mar. 19, 1946 |
| 2,399,726 | Doyle et al. | May 7, 1946 |
| 2,403,117 | Peters | July 2, 1946 |
| 2,408,681 | Pontius | Oct. 1, 1946 |
| 2,429,467 | Ketay | Oct. 21, 1947 |

Certificate of Correction

Patent No. 2,579,510                                                  December 25, 1951

EDWARD J. NAGY ET AL.

It is hereby certified that error appears in the printed specification of the above numbered patent requiring correction as follows:

Column 5, line 55, after "ballistic" insert *tables, the cam itself being in effect a mechanical ballistic*;

and that the said Letters Patent should be read as corrected above, so that the same may conform to the record of the case in the Patent Office.

Signed and sealed this 3rd day of June, A. D. 1952.

[SEAL]

THOMAS F. MURPHY,
*Assistant Commissioner of Patents.*